US006598966B2

(12) United States Patent
Ferraris et al.

(10) Patent No.: US 6,598,966 B2
(45) Date of Patent: Jul. 29, 2003

(54) METHOD OF CREATING COLOR-CHANGING DISPLAYS

(75) Inventors: John P. Ferraris, Coppell, TX (US); Thuc H. Dam, Garland, TX (US); David Meeker, Bryan, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/120,854

(22) Filed: Apr. 11, 2002

(65) Prior Publication Data

US 2002/0141033 A1 Oct. 3, 2002

Related U.S. Application Data

(62) Division of application No. 09/671,549, filed on Sep. 27, 2000, now Pat. No. 6,501,587.

(51) Int. Cl.[7] .................................................. B41J 2/01
(52) U.S. Cl. ........................ 347/96; 347/100; 347/101
(58) Field of Search ........................... 347/96, 100, 101

(56) References Cited

U.S. PATENT DOCUMENTS

| | | | | | |
|---|---|---|---|---|---|
| 3,982,251 | A | * | 9/1976 | Hochberg | 347/96 |
| 4,371,273 | A | * | 2/1983 | Kendall et al. | 347/166 |
| 5,812,300 | A | | 9/1998 | Coleman | 359/265 |
| 6,294,111 | B1 | * | 9/2001 | Shacklett, III et al. | 252/518.1 |

* cited by examiner

Primary Examiner—Hai Pham
Assistant Examiner—Manish S Shah
(74) Attorney, Agent, or Firm—Gardere Wynne Sewell LLP

(57) ABSTRACT

The present invention includes an apparatus for and method of creating electrically modifiable images using a computer printer. In one embodiment, one or more ink reservoirs of a printer cartridge are filled with an electrochromic ink. The printer thus prepared can be used to print electrochromic patterns on a surface using standard ink application methods. In certain embodiments, more than one ink reservoir is filled with electrochromic ink. In these embodiments, separate reservoirs are filled with separate ink formulations so that the characteristics of the electrochromic pattern can be varied.

10 Claims, 5 Drawing Sheets

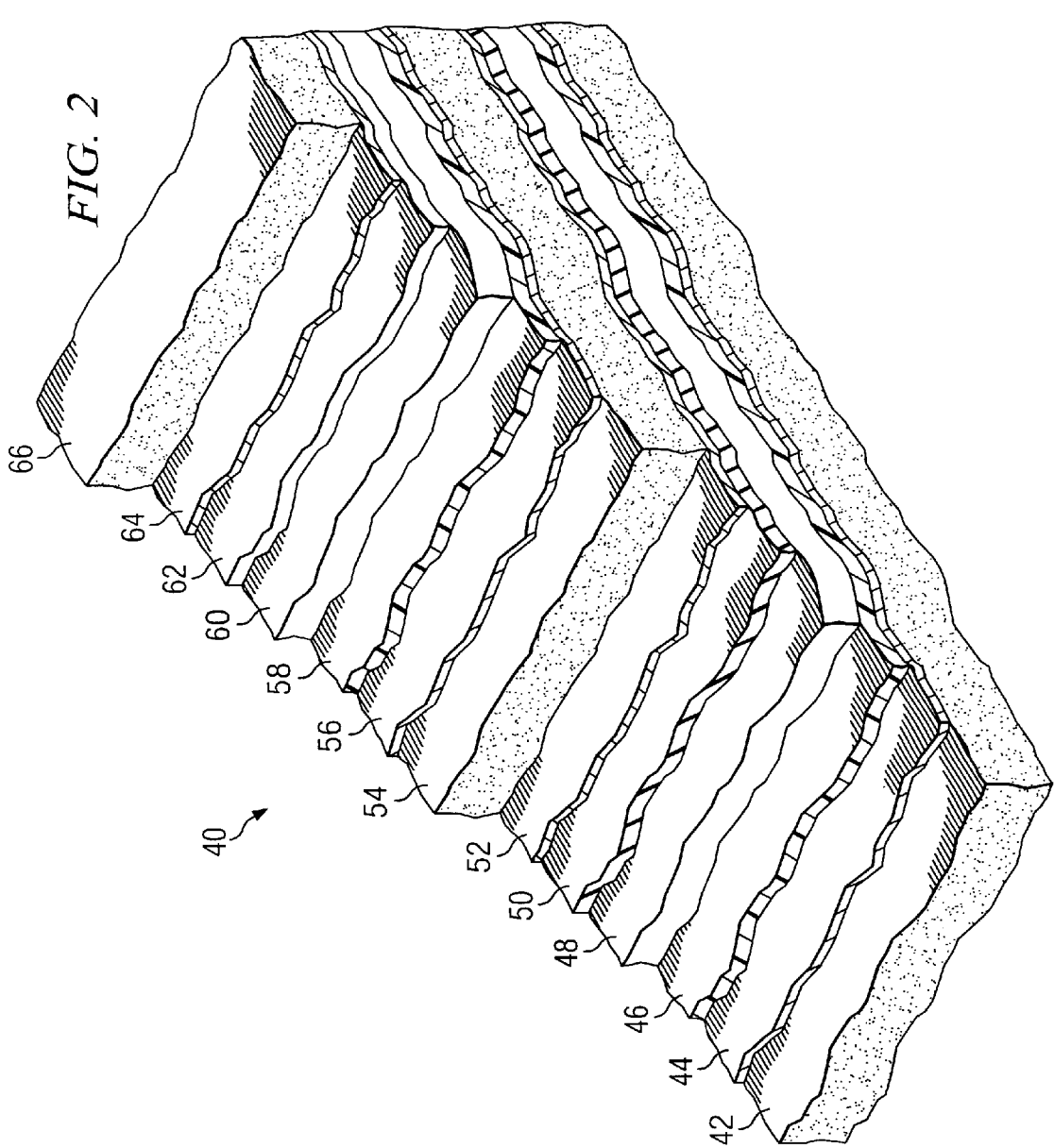

METHOD OF CREATING COLOR-CHANGING DISPLAYS

This Application is a Divisional Patent Application and claims priority from U.S. patent application Ser. No. 09/671,549, filed Sep. 27, 2000 now U.S. Pat. No. 6,501,587, entitled METHOD OF CREATING COLOR-CHANGING DISPLAYS.

The United States Government may own certain rights in this invention under U.S. Army Engineer Waterways Experiment Station, Sponsor Number DACA39-95-K-0027.

TECHNICAL FIELD OF THE INVENTION

The present invention relates generally to the field of electrochromic polymers, and in particular, to the use of commonly-available printing devices to create electrically sensitive color-changing displays.

BACKGROUND OF THE INVENTION

Desktop printers have become common and ubiquitous computer peripherals. The range of technologies used for printing includes, for example, laser, ink jet, piezo electric jet, electrostatic jet, and continuous pressure jet printing processes. Ink-jet printers, for example, are generally popular because they offer high printing speed, low noise, easy color printing, simple construction and low price. The concepts and operational principles of ink jet printers, as well as the other technologies listed, are well known in the art. In general, a cartridge is detachably mounted on a carriage assembly which supports a printhead, and traverses the printhead across the width of a recording medium in a line recording operation along a guide shaft for printing an image or character on the recording medium.

An ink cartridge for such a printer is typically constructed as a unitary, detachable cartridge which includes a printhead comprising a plurality of nozzles in the form of a nozzle plate mounted on one end, and an ink container containing a reservoir of ink on the other. The cartridges generally additionally comprise drop generating structures and electrical connections adapted for electrically coupling the printhead to the printer which provide drop generating energy in response to information signals generated by the printer.

The manner of image generation varies from one technology to another. Certain types of printers generate a thermal pressure wave in the ink container and subsequently eject ink droplets from the ink container through a plurality of nozzles arranged vertically at a front end of the printhead provided with the cartridge. The thermal pressure wave is generated by selected heating elements installed in the nozzles, which heat the ink contained within the nozzles until the ink is ejected through an ejection orifice of the nozzles to produce a flying droplet of the ink. The droplet is deposited on the recording medium, forming a desired character and image.

Many printers incorporate a plurality of ink reservoirs, so as to facilitate the printing of more than one color. Additionally, many such printers incorporate a sufficient number of ink reservoirs to print in each of the three primary colors (red, yellow, and blue). By combining these colors, many such printers can print a continuous spectrum of colors so as to reproduce color images accurately.

Heretofore in the art, computer-controlled printing processes such as those described above have generally been used to produce static printed images. Although static printed images work well for many purposes, certain applications are more suited to the use of variable images. The liquid crystal display and cathode ray tube are two examples of variable image generation media. Each of the two types of media has inherent advantages and disadvantages. A static printed image has the advantage of being small, thin, and light, and therefore highly portable. It also retains its image without respect to whether electrical power is available. A variable image device has the advantage of displaying any arbitrary image at any point in time and of switching or modifying the colors and shapes of the image quickly, but is generally much larger and less portable than a sheet of paper, and requires electrical power to operate. What is needed in the art is a means of combining the portability and robustness of fixed image media with some of the image-variation characteristics of variable image media.

SUMMARY OF THE INVENTION

As noted, all of the prior technologies in the area of image presentation incorporate inherent disadvantages. The present invention overcomes these disadvantages through a combination of novel features. The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention comprises a method of creating electrically modifiable images using a printer of the type described above. In one embodiment, one or more ink reservoirs of a printer cartridge are filled with an electrochromic ink. The printer thus prepared can be used to print electrochromic patterns on a surface using standard ink application methods. In certain embodiments, more than one ink reservoir is filled with electrochromic ink. In these embodiments, separate reservoirs are filled with separate ink formulations so that the characteristics of the electrochromic pattern can be varied.

In one embodiment, the present invention comprises a method for creating an electrochromic display comprising the steps of: printing a pattern in electrochromic ink on a first conductive surface and attaching a sheet having a conductive surface over the pattern such that the conductive surface of the sheet faces the first conductive surface.

In another embodiment, the present invention comprises a method for creating an electrochromic display comprising the steps of: printing a pattern in electrochromic ink on a first conductive surface on a first object; applying a metal oxide to a second conductive surface on a second object; applying an electrolyte to the metal oxide; and assembling the first and second objects with the electrolyte facing the electrochromic ink.

In yet another embodiment, the present invention comprises an electrochromic display device comprising: a conductive surface; an electrochromic pattern disposed on the conductive surface; and a conductor contacting at least some portion of the electrochromic pattern.

Another embodiment of the present invention comprises an electrochromic display device comprising: a first conductive surface; an electrochromic pattern disposed on the first conductive surface; an electrolyte layer disposed on the electrochromic pattern; a metal oxide layer disposed on the electrolyte layer; and a second conductive surface disposed on the metal oxide layer.

In another embodiment, the present invention comprises an apparatus for creating a customizable electrochromic display comprising: an ink reservoir containing electrochromic ink; a print head connected to the ink reservoir in such a manner as to receive electrochromic ink from the ink reservoir; a print media holding mechanism disposed in such a manner as to hold print media at the proper position for receiving electrochromic ink from the print head; and a print controller connected to the print head or print media holding mechanism in such a manner as to control the relative position of the print head and print media.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 2 is a cut-away view of a second embodiment of the present invention;

DETAILED DESCRIPTION OF THE INVENTION

Figure 1:
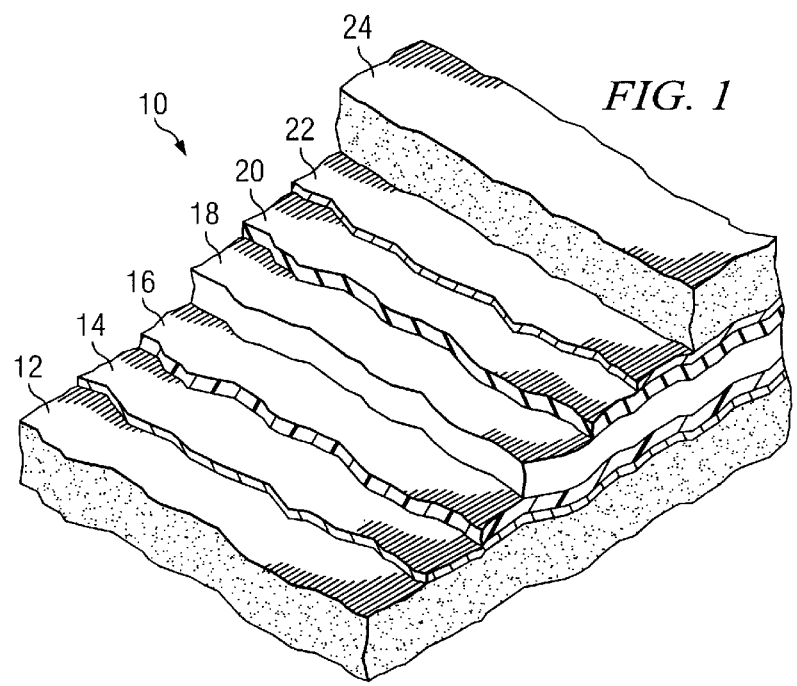
FIG. 1 is a cut-away view of one embodiment of the present invention.

The present invention relates to an apparatus, a process, and a resulting device that provide a user the ability to create, on-demand, any image using electrochromic polymer inks. After printing, the printed images can be readily fashioned into an electrochromic display device. The novel process serves as a simple method for making displays that have the ability to change colors and images in response to applied electrical signals. The commercial applications of the invention include electrochromic smart displays and windows, camouflage materials, and security inks.

Electrochromic materials are known in the art of display generation. The term "electrochromic" refers to a property of the material which causes a color change in response to an applied electrical potential. Known electrochromic materials include polyaniline, polypyrrole, polythiophene, nickel oxide, polyvinylferrocene, polyviologen, tungsten oxide, iridium oxide, molybdenum oxide and ferricferrocyanide (prussian blue).

Electrochromic polymers that been shown to be useful in the present invention include poly(N-methylpyrrole)/polyvinylmethylether (PNMP/PVME), polypyrrole/polyvinylacetate (Ppy/PVA), polyaniline/polyvinylmethylether (PANI/PVME), sodium poly(3-thienyl-3-propylsulfonate) (P3TPSNa), and poly-(aniline-co-N-(4-sulfophenyl) aniline) (PAPSA).

The electrochromic polymer chosen will vary according to the particular application, including the desired color hues. Different electrochromic materials are known to display different colors depending on the voltage applied across them. Some examples include:

| Ink | Initial Color @ 0 V | Observed Color @ + 2 V/−2 V |
|---|---|---|
| Ppy/PVA | Dark orange-brown | Blue/NA |
| PANI/PVME | Green | Blue/Yellow |
| P3TPSNa | Red | Blue/NA |
| PAPSA | Green | Blue/Yellow |

The present invention incorporates printer inks containing electrochromic polymers such as those discussed above. These inks allow users to easily generate electrochromic devices using a wide variety of modern printers. The ability to dispense electrochromic polymers in a precise pattern and to change the colors of the deposited polymer pixels allow users to tailor both the images and their colors. In certain embodiments, the present invention allows the user to print any computer generated image on demand using these inks. In certain embodiments, a completed imaging device may incorporate multiple layers of printed films, with each layer having a different pattern printed thereon. In certain embodiments, the layers may comprise shades of certain primary colors that can be modified across a spectrum of different colors by the application of electrical voltages across the imaged films.

In certain embodiments, the present invention can be employed to produce active camouflage devices. Most current camouflage technologies rely upon nonactive images painted onto a particular object to make it resemble its surrounding environment. The present invention differs from these because it provides a means for changing the color and pattern of the camouflage. For example, an object covered with green patterns would not be appropriately camouflaged in a brown vegetative surrounding, but with active camouflage created via printed electrochromic polymer patterns, it is possible to change both the patterns and the colors.

Conductor patterns on the working electrode can be created via photolithography or silk screen printing in addition to the printing processes described above. Electrochromic polymers can be deposited directly onto the patterned conductors via the same methods. With the addition of a counter electrode, the individual patterns on the device can be controlled via application of electrical potential through individual leads.

One embodiment of an electrochromic device produced according to the methods disclosed in the present application is shown in FIG. 1 and generally designated 10. Device 10 comprises a lower layer 12, which may be a polymer film, a lower conductor layer 14, and a pattern layer 16. Certain embodiments of the present invention incorporate a solid polymer electrolyte layer 18 and an oxide layer 20, which may in certain embodiments be vanadium oxide. Device 10 additionally comprises upper conductor layer 22, and may additionally comprise an upper layer 24, which may be a polymer film. In various embodiments, either or both of lower and upper layers 12 and 24 may comprise a polyester film such as MYLAR™. Transparent conductor layersw 14 and 22 may in certain embodiments comprise indium tin oxide. In a device 10 constructed as described above, the color of the electrochromic material comprising the pattern 16 can be varied by varying the voltage differential between lower conductor layer 14 and upper conductor layer 22.

Another embodiment of an electrochromic device produced according to the present invention is shown in FIG. 2 and generally designated 40. Device 40 comprises a lower polymer film layer 42, lower transparent conductor layer 44, first pattern layer 46, solid polymer electrolyte layer 48, vanadium oxide layer 50, lower is intermediate transparent conductor layer 52, and intermediate polymer film layer 54.

In contrast to the embodiment shown in FIG. 1, the device 40 comprises a second imaging layer, incorporating a second patterned layer 58. With this design, the color of patterned layer 58 can be independently controlled from the color of patterned layer 46. As can be seen in FIG. 2, the upper imaging layer of device 40 comprises an intermediate polymer film layer 54, a second lower transparent conductor layer 56, a second pattern layer 58, solid polymer electrolyte layer 60, vanadium oxide layer 62, upper transparent conductor layer 64, and upper polymer film layer 66. In various embodiments, any one or more of polymer film layers 42, 54, and 66 may comprise a polyester film such as MYLAR™. Transparent conductor layers 44, 52, 56, and 64 may in certain embodiments comprise indium tin oxide.

Figure 3:
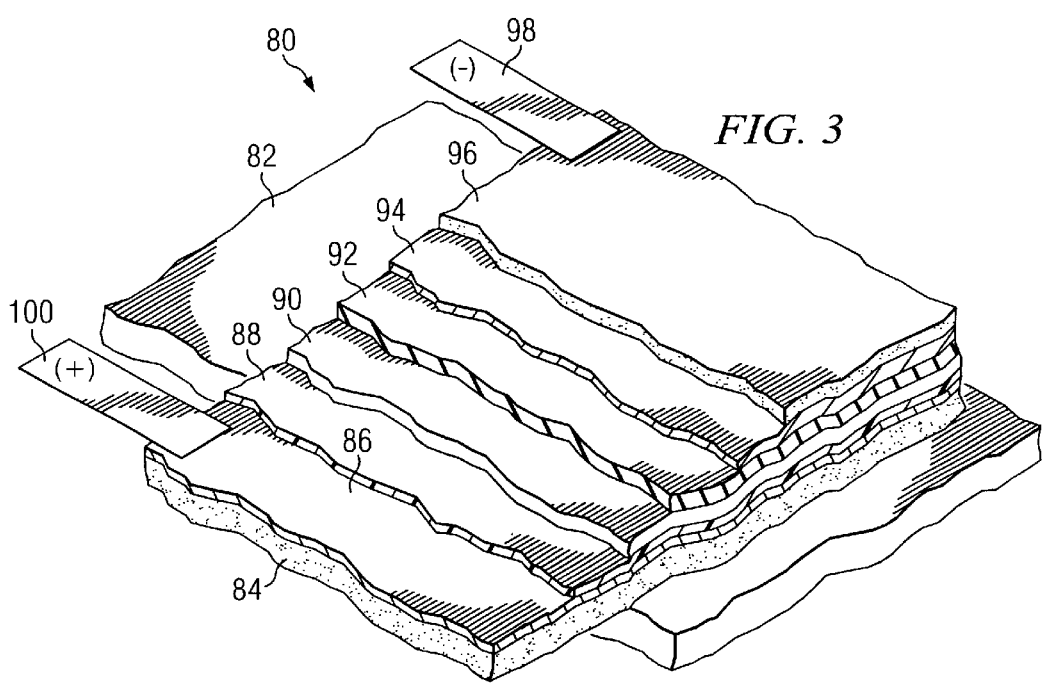
FIG. 3 is a cut-away view of a third embodiment of the present invention.

A third embodiment of an electrochromic device produced according to the present invention is shown in FIG. 3 and generally designated 80. Device 80 comprises a background image 82, a lower polymer film layer 84, lower transparent conductor layer 86, first patterned layer 88, solid polymer electrolyte layer 90, vanadium oxide layer 92, upper transparent conductor layer 94, and upper polymer film layer 96. Voltage across the device is controlled through electrodes 98 and 100. This embodiment is similar to that shown in FIG. 1, additionally comprising background image 82. The background image 82 may comprise a single color, or may comprise a multi-color image. The incorporation of background image 82 allows the device 80 to display a broader range of colors and images as compared to a device having a white or transparent back surface.

Figure 4:
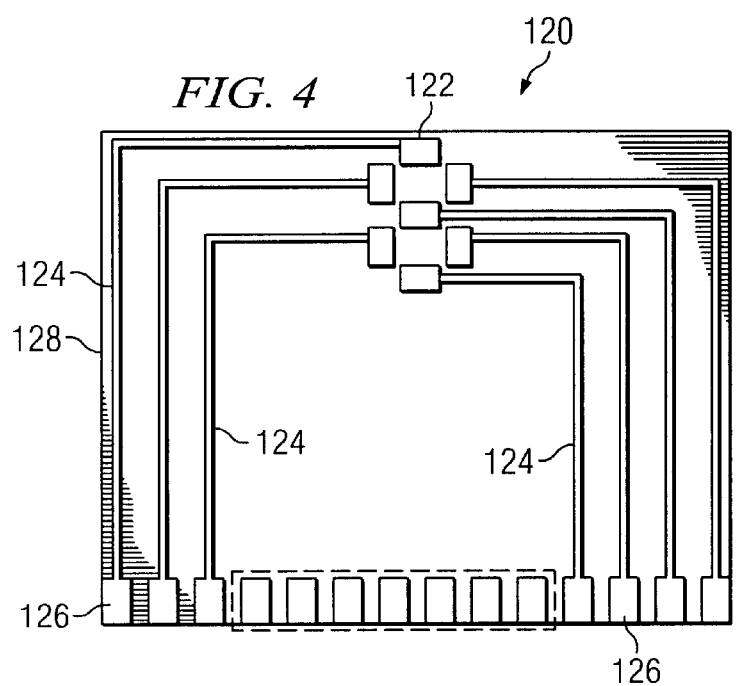
FIGS. 4 and 5 are top down views of a fourth embodiment of the present invention.
Figure 5:
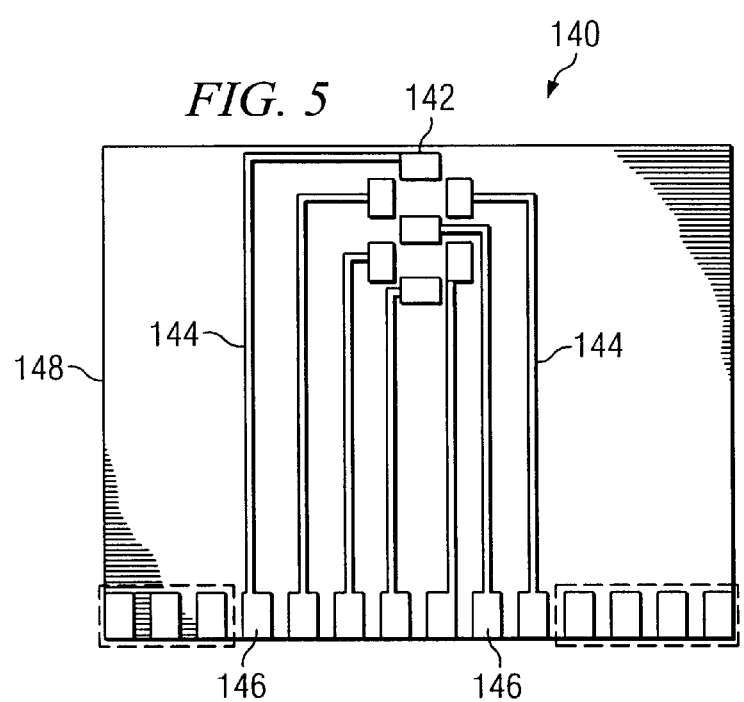
Figure 6:
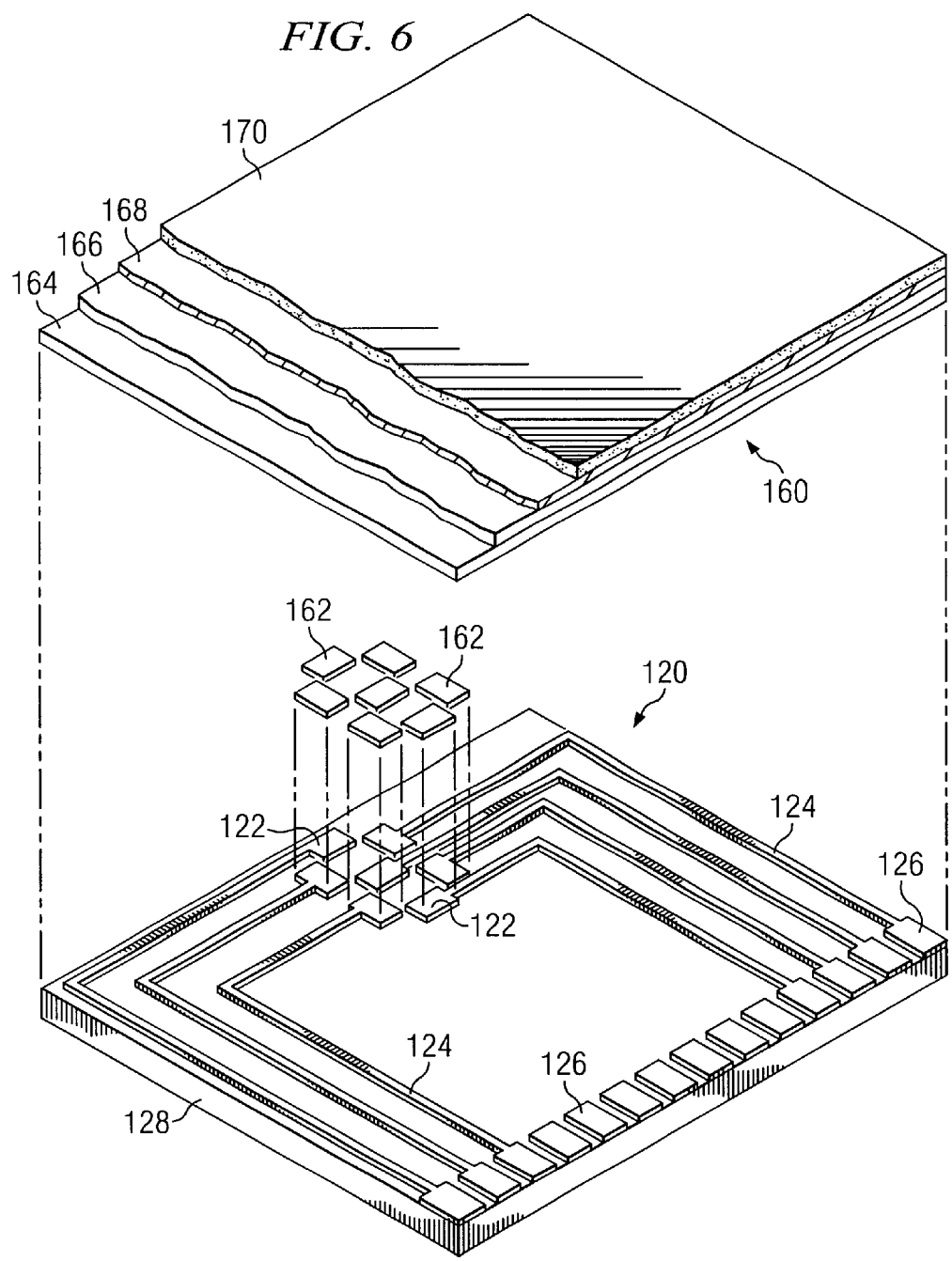
FIG. 6 is an exploded isometric view of the fourth embodiment of the present invention.

A fourth embodiment of the present invention is shown in FIGS. 4, 5, and 6. This embodiment comprises a display device having a pattern useful for displaying alphanumeric characters similar to those used in liquid crystal and light-emitting diode displays. Through the selective application of voltage across selected portions of the image, individual portions of the image can be shifted in color while leaving other portions unchanged.

FIG. 4 shows a first patterned layer 120 having a pattern suitable for creating a variable alphanumeric display. Layer 120 comprises conductive pads 122, conductor lines 124, and conductive connection pads 126. Similarly, FIG. 5 shows a second patterned layer 140 suitable for the same purpose. In certain embodiments, layer 120 can be used as the working electrode and layer 140 can be used as the counter electrode in a display device according to the present invention. In certain embodiments, layers 120 and 140 comprise patterns etched in indium tin oxide on the surface of a polymer sheet.

FIG. 6 shows an exploded isometric view of the layers of a device 160 according to the present invention. Device 160 comprises etched layer 120 having conductive pads 122, conductor lines 124, and conductive connection pads 126 for supplying electrical voltage to the electrochromic polymer layer. Device 160 further comprises electrochromic pads 162, electrolyte layer 164, vanadium oxide layer 166, upper conductive layer 168, and upper polymer layer 170.

It will be understood by one of skill in the art that the embodiments shown in FIGS. 4, 5, and 6 can be combined in an array, such that a complex multi-character alphanumeric display matrix can be created thereby. Alternately, these embodiments can be combined with a variety of graphical electrochromic patterns in the same device without departing from the spirit and scope of the present invention.

Figure 7:
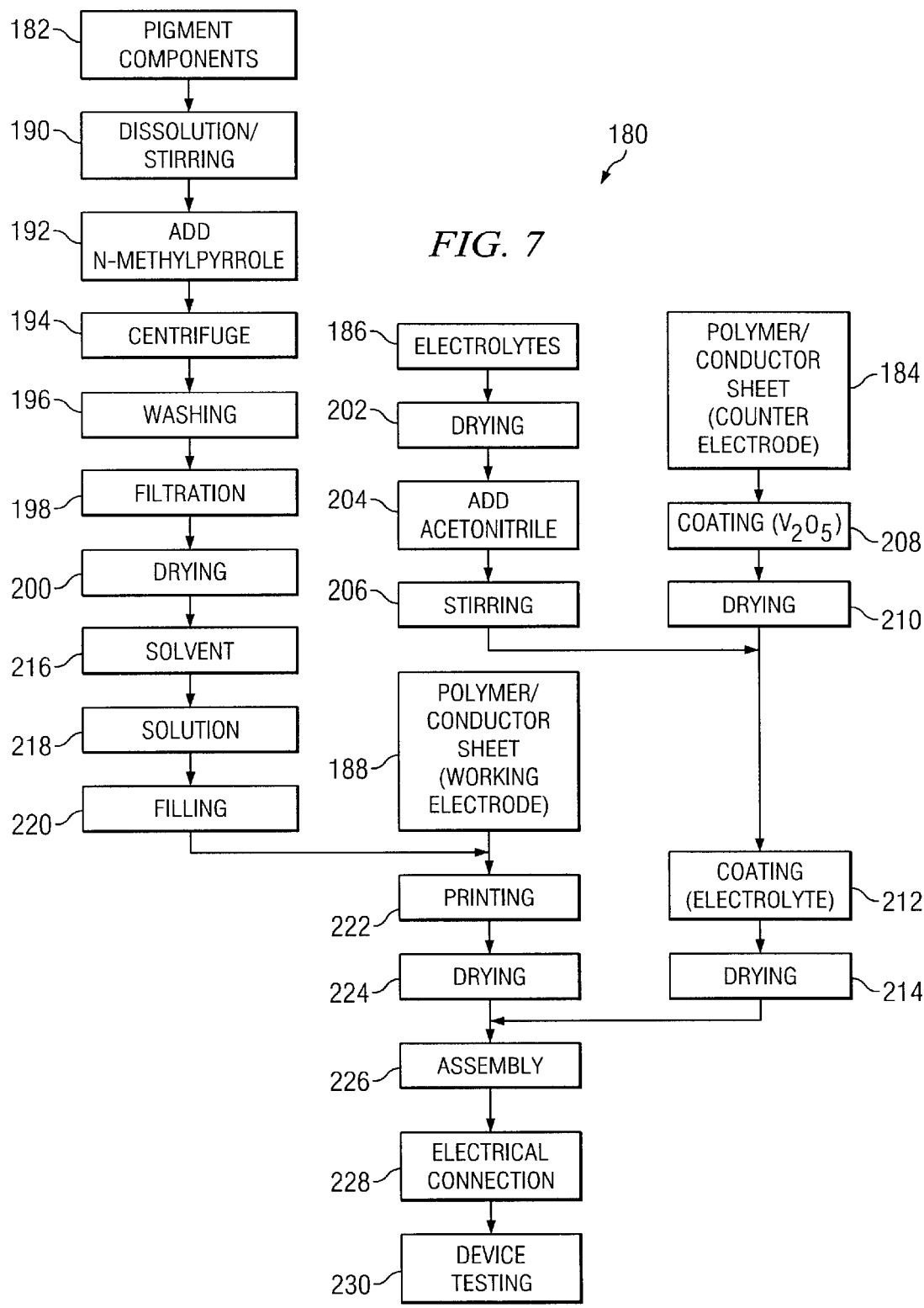
FIG. 7 is a flowchart depicting the method of manufacture of one embodiment of the present invention.

FIG. 7 shows a flowchart 180 depicting the process of manufacture of a device according to the present invention. The basic components of the process comprise the electrochromic pigment 182, a first conductor-coated polymer acting as a working electrode 184, a group of selected electrolytes 186, and a second conductor-coated polymer acting as a counter electrode 188.

The process of device fabrication begins with electrochromic ink synthesis. Colloidal electrochromic polymer pigments are prepared from pigment components 172, which will vary according to the pigment to be synthesized. In certain embodiments, the electrochromic polymer selected comprises Poly(N-methylpyrrole)/PVME (PNMP/PVME). PNMP/PVME can be prepared in a manner similar to methods known in the art as being useful for synthesizing polypyrrol/PVME.

As shown in FIG. 7, the synthesis process for PNMP/PVME begins with dissolution of the pigment components 190. In one embodiment, the dissolution process 190 comprises dissolution of 0.5 g of PVME and 11.45 g of $FeCl_3$ in a 100 mL stirring solution of 50% EtOH and 50% $H_2O$ under $N_2$ atmosphere for 30 minutes. After dissolution and stirring 190, N-methylpyrrole is added 192 to the solution. In certain embodiments, this component is added in a dropwise manner over a 10 minute period. In certain embodiments, the reaction is carried out by stirring the new solution at 20 C. for 5 hours.

Precipitates from the reaction are centrifuged 194, collected, and washed 196. In certain embodiments, the centrifuge is operated at approximately 5000 rpm during polymer collection. In certain embodiments, the washing process 196 comprises washing 3 times with one molar HCl at 80 degrees C. and then 3 times more with $H_2O$ at 80 degrees C. The washed precipitates are then filtered 198 and dried 200. In certain embodiments, the precipitates are dried in a vacuum oven at 45 C. and 10 mm Hg for 72 hours.

As part of the device preparation, a polymeric electrolyte is prepared for coating of the electrode surface. In one embodiment, 500 mg (or approximately 83%) of Poly (methyl methacrylate), 100 mg (or approximately 16.5%) of lithium tetrafluoroborate, 2 g (or approximately 0.3%) of propylene carbonate, and 2 g (or approximately 0.3%) of ethylene carbonate are provided 186 and dried 202. In certain embodiments, drying takes place under vacuum for 24 hours. Three milliliters of dried acetonitrile are added 204, and the mixture is stirred 206 until all components are dissolved. In certain embodiments, stirring 206 occurs at room temperature.

At some point during the fabrication process, a piece of polymer sheet having a conductive material deposited on one face is provided 184. The conductive face of the sheet is coated 208 with solution of vanadium triisopropoxide in a solvent. In certain embodiments, the coating 208 is performed by a spin coating process. In certain embodiments, the solution comprises a 1% by volume solution of vanadium triisopropoxide in isopropyl alcohol.

The sheet having the coating thereon is then dried 210. In certain embodiments, the sheet is dried 210 for 30 minutes. In certain embodiments, the drying process 210 is performed at approximately 60 degrees C. in a vacuum oven. After being dried 210, the surface is coated 212 with the electrolyte prepared in 202–206. In certain embodiments, coating 212 is performed by spin coating. In certain embodiments, the quantity of electrolyte used is approximately 0.2 mL. In certain embodiments, spin coating is performed with a LAURELL™ spin coater at 1500 RPM for 1 minute durations. After coating 212, the electrolyte is dried 214. In certain embodiments, the electrolyte is dried for approximately 1 hour.

Prior to printing of the electrochromic pattern on the prepared polymer sheet, the dry electrochromic pigment prepared in 190–200 must be formed into an ink suitable for use in a printer, for example an ink-jet. The pigments are first dissolved 216 into a solvent. In one embodiment, the solvent comprises a mixture of methanol, deionized water, 2-butanol, PEO, and glycerol. In one embodiment, the solvent mix incorporates these components in approximate percentages of 54%, 22%, 16%, 0.03%, and 8%, respectively. In one embodiment, the solvent mix incorporates these components in the amounts of 50 g, 20 g, 15 g, 0.03 g, and 7.5 g, respectively, for mixture with 5–10 g of pigment.

In a second embodiment, the solvent mix comprises PVME and methylcellulose added to the solvent mixture described above. In certain embodiments, this solvent mix incorporates these components in the amounts of 1.2 g and 0.03 g, respectively. It will be appreciated by those of skill in the art that other typical ink vehicles can be formulated to carry the electrochromic pigments in addition to the above-described.

In certain embodiments, the printer inks are prepared by dissolving 218 each pigment in a solvent 216 and sonicating for 4 hours. In certain embodiments, 1 g of pigment is used for each 20 mL of solvent. PANI/PVME is prepared by dissolution into the first solvent mix, while Poly(3-thienyl-3-propylsulfonate (P3TPSNa) ink is prepared by dissolution into the second solvent mix. Methods of fabrication of PANI/PVME and of P3TPSNa are known to those of skill in the art.

After preparation of the electrochromic inks as described above, one or more ink cartridges are filled 220 with the above inks and placed in a printer. Certain embodiments of the present invention use HP Deskjet 560C black ink cartridges. A desired pattern is printed 222 onto the prepared surface of the polymer sheet prepared according to 202–214. The printed surface of the working electrode is then dried 224. In certain embodiments, the electrode is dried at approximately 150 C. for approximately 5 minutes.

After printing, the dried electrode is assembled 226 to a counter electrode 188 and electrically connected 228 to a voltage control device. After electrical connection 228, the device can be tested 230.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. An apparatus for creating a customizable electrochromic display comprising:
    an ink reservoir containing electrochromic ink;
    a print head connected to the ink reservoir in such a manner as to receive electrochromic ink from the ink reservoir;
    a print media holding mechanism disposed in such a manner as to hold print media at the proper position for receiving electrochromic ink from the print head; and
    a print controller connected to the print head or print media holding mechanism in such a manner as to control the relative position of the print head and print media.

2. The device of claim 1 wherein the print head comprises one of: an ink jet print head, a piezo electric jet print head, an electrostatic jet print head, or a continuous pressure jet print head.

3. The device of claim 2 wherein the print head is an ink jet print head.

4. The device of claim 1 wherein the electrochromic ink comprises a polymeric electrochromic pigment suspended in a solvent.

5. The device of claim 4 wherein the polymeric electrochromic pigment comprises one or more of: poly(N-methylpyrrole)/polyvinylmethylether (PNMP/PVME), polypyrrole/polyvinylacetate (Ppy/PVA), polyaniline/polyvinylmethylether (PANI/PVME), sodium poly(3-thienyl-3-propylsulfonate) (P3TPSNa), and poly-(aniline-co-N-(4-sulfophenyl) aniline) (PAPSA).

6. The device of claim 4 wherein the solvent comprises one or more of:
    methanol, deionized water, 2-butanol, PEO, glycerol, PVME and methylcellulose.

7. The device of claim 4 wherein the solvent comprises approximately 54% of methanol, approximately 22% of deionized water, approximately 16% of 2-butanol, approximately 0.03% of PEO, and approximately 8% of glycerol.

8. The device of claim 4 wherein approximately 20 mL of solvent are used for each 1 g of pigment.

9. The device of claim 1 further comprising a second ink reservoir containing
    a second electrochromic ink; and
    a duct connecting the second electrochromic ink reservoir to the print head.

10. The device of claim 9 wherein the printhead is designed to print in both inks in a single pass.

* * * * *